Figure 1:
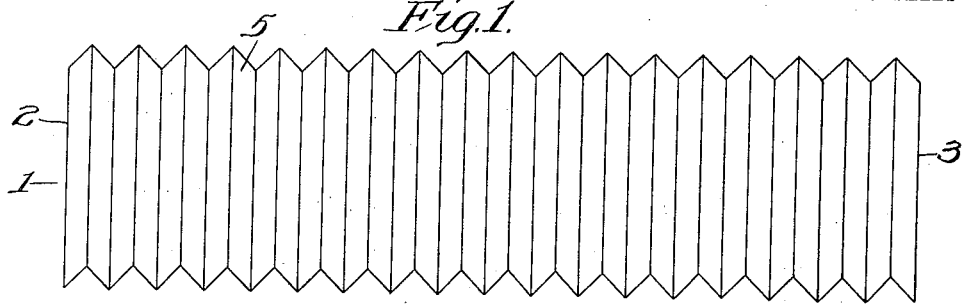

L. LUMIERE.
ACOUSTICAL INSTRUMENT.
APPLICATION FILED MAR. 26, 1910.

1,036,529.

Patented Aug. 20, 1912.

5 SHEETS—SHEET 1.

WITNESSES
F. J. Hartman
J. Henderson

INVENTOR
Louis Lumiere.
BY Horace Pell
ATTORNEY

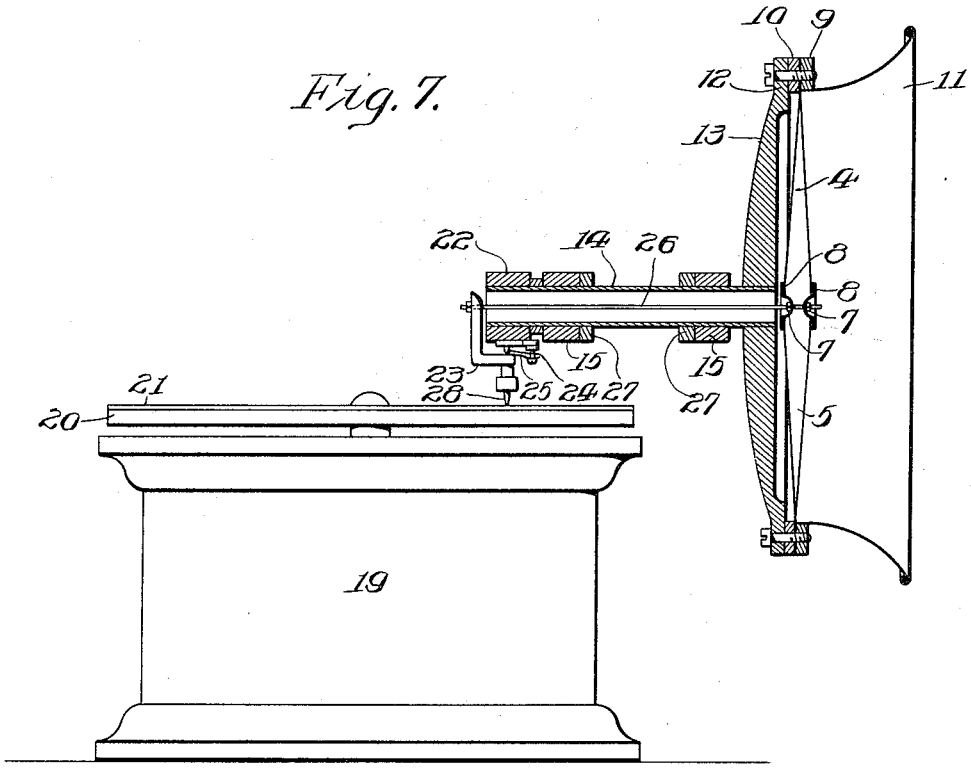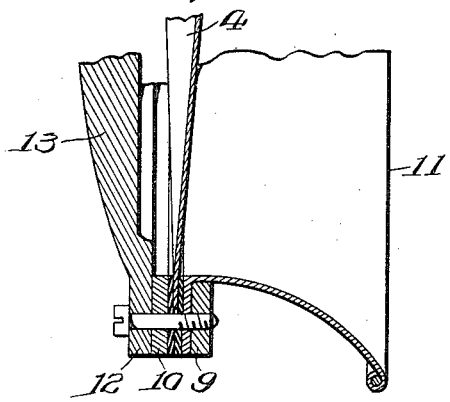

L. LUMIERE.
ACOUSTICAL INSTRUMENT.
APPLICATION FILED MAR. 26, 1910.

1,036,529.

Patented Aug. 20, 1912.
5 SHEETS—SHEET 3.

INVENTOR
Louis Lumiere.

WITNESSES

BY

ATTORNEY

L. LUMIERE.
ACOUSTICAL INSTRUMENT.
APPLICATION FILED MAR. 26, 1910.

1,036,529.

Patented Aug. 20, 1912.
5 SHEETS—SHEET 5.

WITNESSES
F. J. Hartman.
J. Henderson

INVENTOR
Louis Lumiere.
BY Horace Pettit
ATTORNEY

UNITED STATES PATENT OFFICE.

LOUIS LUMIERE, OF LYON, FRANCE, ASSIGNOR TO VICTOR TALKING MACHINE COMPANY, OF CAMDEN, NEW JERSEY, A CORPORATION OF NEW JERSEY.

ACOUSTICAL INSTRUMENT.

1,036,529.

Specification of Letters Patent. Patented Aug. 20, 1912.

Original application filed June 30, 1909, Serial No. 505,149. Divided and this application filed March 26, 1910. Serial No. 551,638.

*To all whom it may concern:*

Be it known that I, LOUIS LUMIERE, a citizen of the Republic of France, residing at Lyon, in the Republic of France, have invented certain new and useful Improvements in Acoustical Instruments, of which the following is a full, clear, and complete disclosure.

This invention relates to improvements in acoustical instruments, such as telephones, microphones, sound recording and reproducing machines, and musical instruments in general, and the present application is a division of an application filed by me June 30, 1909, Serial Number 505,149.

As applied to sound recording and reproducing apparatus, my invention relates more particularly to that part of the instrument which is generally known as the diaphragm, or the body which in the process of sound recording is thrown into vibration by the sound waves, and the vibrations of which are traced and recorded by means of a stylus in the original record, while in the process of reproduction the diaphragm, (as a general rule, the diaphragm of a separate machine) is thrown into corresponding vibrations by a stylus to which it is attached, being made to follow the undulations in the record.

My invention also relates to the sound box in which said diaphragm is mounted.

The object of my invention is to provide a diaphragm and a mounting therefor, by means of which sounds may be faithfully recorded and reproduced, which will be sensitive to sound waves and by the use of which the reproduction of sound will be improved and amplified.

Further objects of my invention are to increase the reproducing surface of a diaphragm, and, at the same time, to place the entire surface under a tension, (preferably entire surface under a tension, (preferably torsional), to make it sensitive; to increase the active surface of a diaphragm of a certain given diameter; to increase the diameter of the diaphragm without making it liable to vibrate in parts, or to set up nodes or inactive portions in the diaphragm, or, in other words, to substantially increase the size of the diaphragm and, at the same time, have it vibrate throughout; to construct a diaphragm having a plurality of sound responsive elements, each of which is subjected to a molecular tension, and to subject each of a plurality of sound responsive elements to a molecular tension to increase the sensitiveness thereof and to cause them to vibrate as a whole.

Further objects of my invention will be found in the specification and claims below.

The invention consists in a diaphragm for acoustical instruments, having one or more freely resilient, sound responsive surfaces or elements, which have been brought into a condition of molecular stress, of an aggregate superficial area substantially larger than the surface of a plane disk of the same diameter, and in a recorder or reproducer in which said diaphragm is mounted.

It is found that the effect of bringing the surfaces of a vibrating body into a condition of molecular stress by torsion, is to reduce to a minimum the tendency of the vibrating body to form nodes during operation, so that the surface or surfaces of the diaphragm will vibrate as a whole and will not produce the disagreeable effect which is technically known as blasting or shattering.

One construction of diaphragm made according to this invention and the method of making it is illustrated in the accompanying drawings, in which:—

Figure 2:
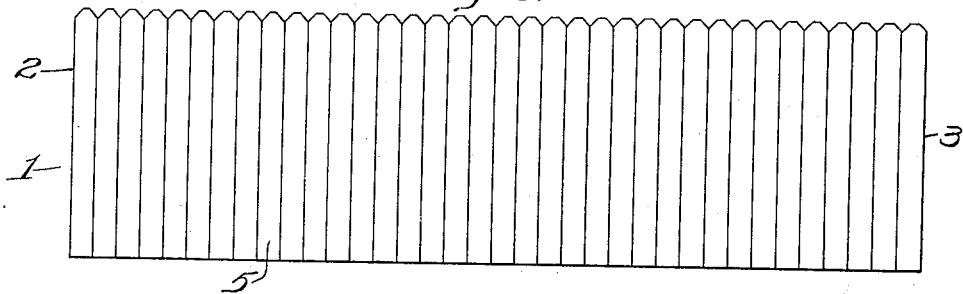
Figure 3:
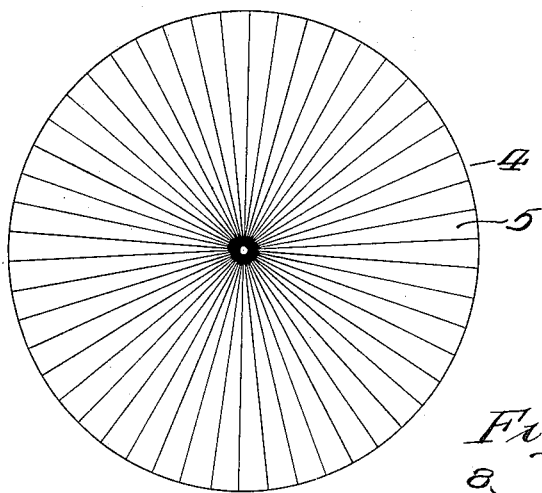
Figure 4:
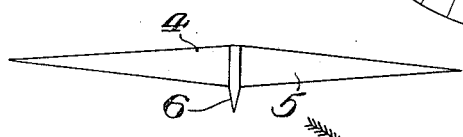
Figure 5:
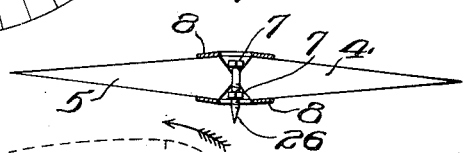
Figure 6:
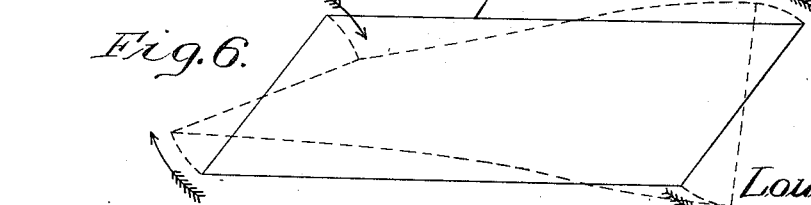
Figure 8:
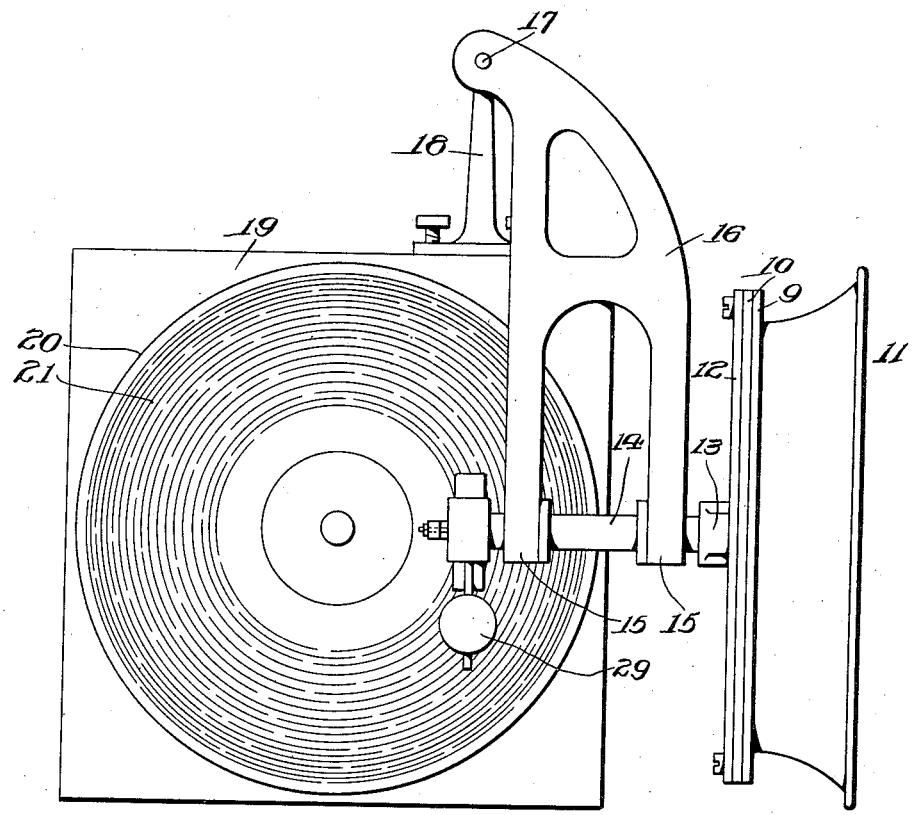
Figure 9:
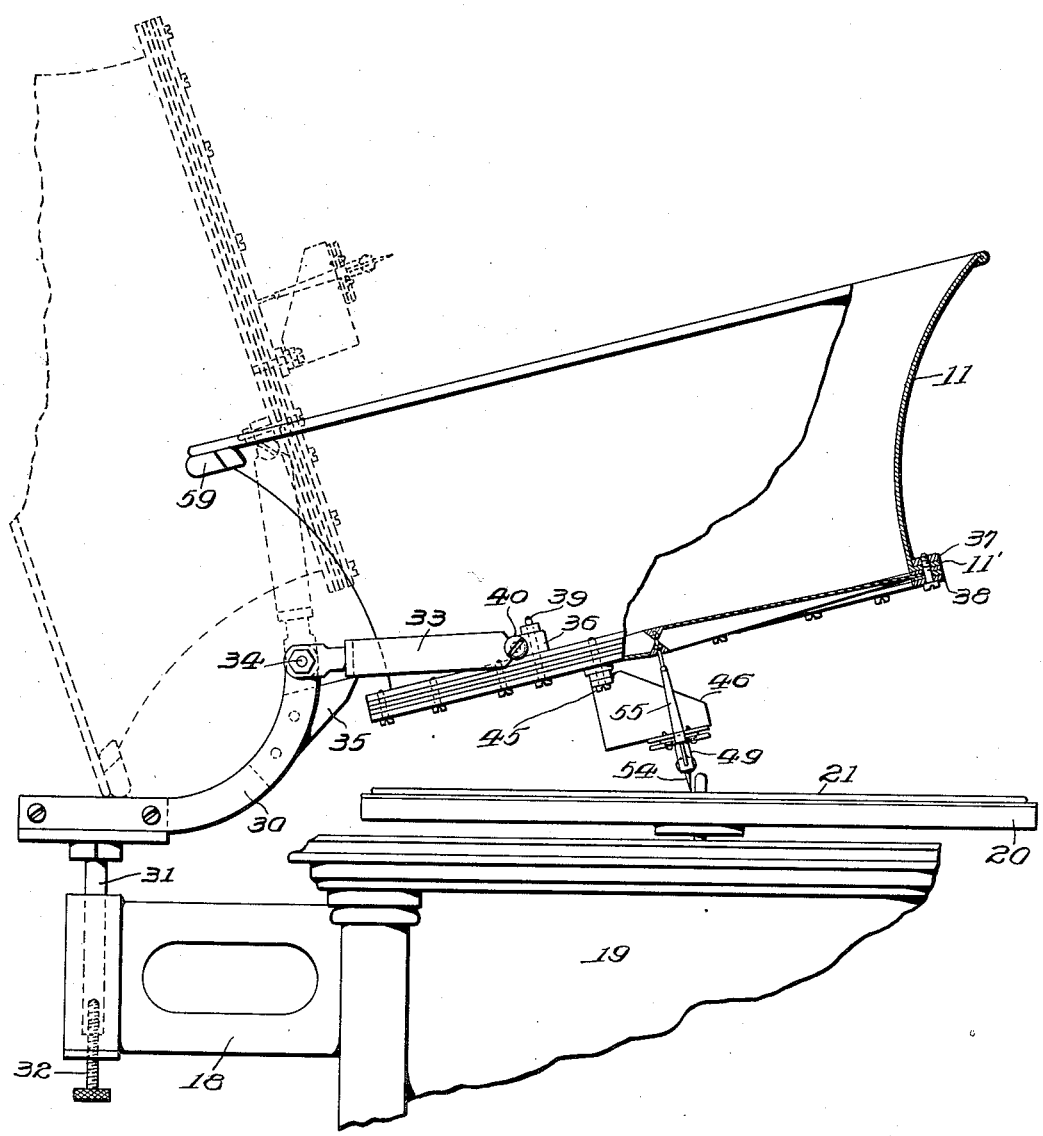

Figure 1 shows a folded strip of material from which the improved diaphragm may be made; Fig. 2 is a plan view of a modified form of folded strip of material from which a diaphragm may be made; Fig. 3 is a plan view of the diaphragm; Fig. 4 is a sectional elevation of the diaphragm; Fig. 5 is a sectional elevational view of a slightly modified form of diaphragm; Fig. 6 is a diagram to illustrate the way in which the surfaces or elements of the diaphragm are twisted; Fig. 7 is an elevation of a sound reproducing machine fitted with the diaphragm made in accordance with this invention and illustrates a convenient method of carrying the diaphragm and connecting it to the stylus bar; and Fig. 7ª is a sectional detail portion of Fig. 7. Fig. 8 is a plan view of the machine shown in Fig. 7.; Fig. 9 is a side elevational view partly in section of a modified form of sound reproducing machine provided with my invention. Fig.

Figure 11:
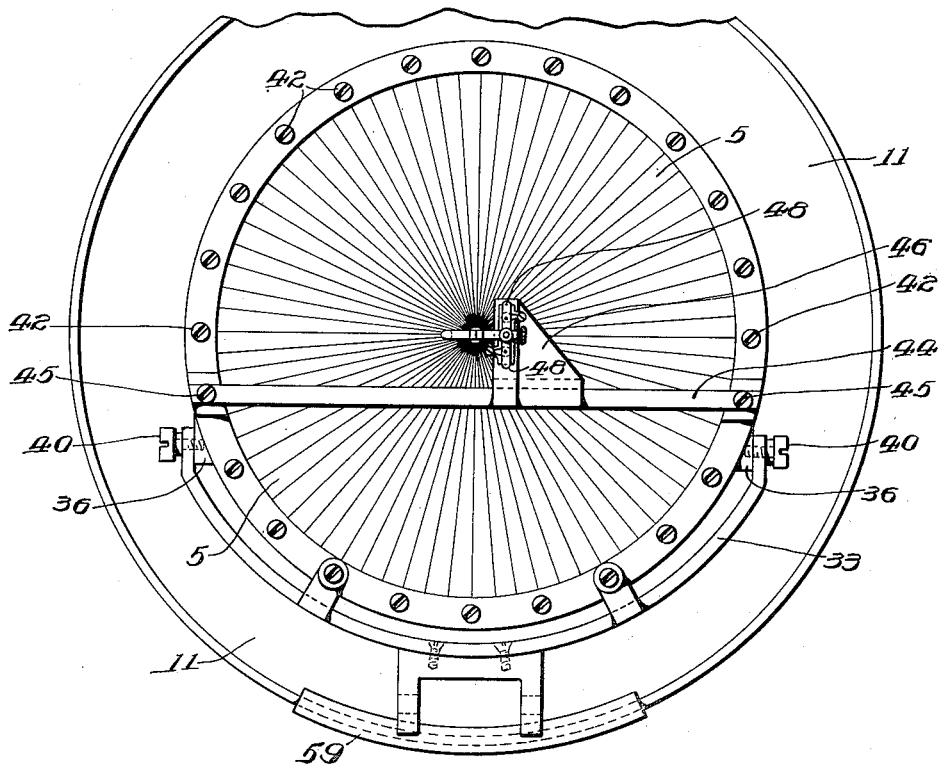

10 is an enlarged view, partly in section, of the diaphragm and stylus bar mounting shown in Fig. 9; and Fig. 11 is a bottom plan view of the reproducer shown in Fig. 9.

According to one method of carrying out this invention, a diaphragm is constructed so that it represents the form shown in Figs. 1, 3 and 4 of the accompanying drawings, in which the whole surface of the diaphragm on either side consists of a plurality of elements reversely flexed to form a fan-like series of radially disposed ridges and furrows, the ridges on one side of the diaphragm corresponding to the furrows on the other side of the diaphragm, and the furrows gradually widening out and becoming less deep as they approach the edge of the diaphragm until at its perimeter the diaphragm lies in one plane. The elements forming the sides of the ridges and furrows provide the desired freely resilient sound responsive surfaces. A diaphragm of this form may be obtained by folding or plaiting a substantially rectangular strip of paper 1, or other suitable material in the manner shown in Fig. 1. The length of the strip of material before folding should be substantially the length of the circumference of the diaphragm to be formed therefrom, and the width of the strip should be substantially equal to the radius of the said diaphragm. When the strip has been plaited or folded in the manner above described and shown, the ends 2 and 3 should be brought together and secured to each other in any suitable manner. At this stage of the process or method, the strip will present, roughly speaking, the appearance of a cylinder having fluted sides. This strip of material is then pressed down and forced to assume the form shown in Figs. 3 and 4, one edge of the strip being crimped together at the center, and the other edge forming the perimeter; the radial ridges and furrows, or plaits being closest together and of greatest depth at the center, and gradually opening out and flattening toward the edge, where the diaphragm may be held in one plane between clamping rings, as shown in Figs. 7 to 11. In Fig. 3 the diaphragm is designated as 4 and the elements forming the plaits or ridges and furrows are designated by the numeral 5. The diaphragm 4 thus formed in the manner above described will be seen to have a surface formed wholly of a multiplicity of flexed sound responsive elements, reversely sloped or angled to each other; forming dihedral ridges. The surface of the diaphragm will consist of a surface comprising salient radial angled surfaces, and radial reëntrant angled surfaces. Any sector of the surface will have a fan-like formation. To the center of the diaphragm, is attached, in any suitable manner, the recording or reproducing stylus 6, as the case may be. As shown in Fig. 4, the diaphragm is for use with or for a record having an up and down, or vertical cut, since the diaphragm is directly provided with a stylus at its center. For making the attachment between the stylus and diaphragm, or between the connection between the stylus and the diaphragm, I prefer to bevel off the inner edge of the diaphragm as particularly shown in Figs. 2, 9 and 10. The stylus 6 may be secured directly to the inner edges of the elements of the diaphragm by being cemented or glued thereto in the manner shown in Fig. 4, or it may be secured in place by means of nuts 7, as will be more particularly described below, in connection with the form of apparatus shown in Figs. 5, 9 and 10. The stylus 6 may also be surrounded by rings of stiff paper 8, secured on either side of the diaphragm at the center thereof to give it additional rigidity at that point. I do not, however, limit myself to this form of connection. The effect of constructing the diaphragm in this manner, is that the whole diaphragm, i. e., the surface of each element of each ridge and furrow is under molecular stress, produced by torsion, but the sides of the ridges and furrows are twisted out of the plane in which they lie at the center of the diaphragm into a plane, practically at right angles thereto, at the circumference of the diaphragm. I have further found that in a diaphragm produced by this means, the tendency of the vibrating body to form nodes during operation is reduced to a minimum. The surface of each of the elements composing this diaphragm being helicoidal, and since each point in the vibrating body, as it moves, follows a direction normal to the tangential plane at this point, the result is that the direction of movement is different for each point that has to be considered so that the formation of nodes is practically impossible. It is obvious, of course, that the same condition of molecular stress would be produced upon twisting a sheet of material which naturally possessed a helicoidal, or other than plane, form so as to take up a position in a true plane, or other helicoidal form of different pitch.

The diagram shown in Fig. 6, illustrates clearly the torsion which is applied to each of the multiple surfaces or elements of the diaphragm when the strip of material is made to take up the form shown in Figs. 3 and 4 from the form shown in Fig. 1. In this diagram 5' represents a thin flat sheet of elastic material, such as is formed by each of the several folds or plaitings of the strip shown in Figs. 1 and 2. If the two ends of this sheet are turned in opposite directions, as indicated by the arrows, and is made to take up the position shown in dotted lines, it is found that a very resilient body is formed, which is capable of vibrating more readily, and is more sensitive, *i. e.*, more sound responsive in its new position than it was before. This is probably due to the molecular stress which is imparted to it by this twisting action.

It will be clear that each of the surfaces or folds 5, of the diaphragm illustrated in Figs. 3 and 4 is in the same condition of molecular stress, as the sheet 5' in Fig. 6.

The width of the folds 5, relative to the breadth of the strip in which they are made, may vary; but I have found a convenient proportion to adopt when making the diaphragm of paper is about 10 to 1, so that each fold of the strip is 10 times as long as wide.

I have found that in a diaphragm having multiple resilient surfaces such as that above described, a greatly improved reproduction can be obtained. Moreover, a diaphragm constructed in the manner above described can be usefully made of considerably greater diameter than has heretofore been possible. Experience has seemed to prove that a plane diaphragm of mica, or other material, such as is used at the present day, if made of more than about three-and-a-half inches in diameter, loses in quality of reproduction, the reproduction becoming less musical and there being a liability to what there is technically known as "shattering," due probably to the diaphragm not vibrating as a whole, *i. e.*, to the setting up of nodes in the diaphragm. I have found, however, that I am able to make a diaphragm according to the present invention, as large as ten inches or more in diameter, without impairing the quality of the reproduction, and by means of this diaphragm, I at the same time, attain a much greater volume of sound than with the smaller diaphragm. This amplification of the sound, I believe to be due, not only to the increased diameter of the diaphragm, but also to the increased surface area of the diaphragm produced in the construction above described, by the plaitings or crimpings or folds in the material of the diaphragm; this appears to have the effect of putting into motion a greater volume of air and so increasing the volume of sound.

A diaphragm having freely resilient sound responsive surfaces brought into a condition of molecular stress, preferably by torsion, and also of an aggregate area substantially larger than a plane disk of the same diameter may of course be produced in other ways than that above described. I have found, however, that the above described method is a convenient one for making the diaphragm.

The advantage arising from the use of a diaphragm constructed as above described, is that the volume of sound produced is sufficient to enable me to dispense with the usual amplifying horn, and in this way, much of the metallic and hollow character usually associated with talking machine reproductions is eliminated.

Diaphragms may be made according to this invention, of any suitable elastic material, such as paper, (which may be varnished if desired), card, celluloid, metal, or the like, and the surface, or surfaces, of the diaphragm, or elements composing the vibrating body, may be put under tension by any suitable means.

One means of mounting the stylus bar and diaphragm in an operative position particularly for use with a record having a record of sound in the form of a groove having lateral undulations in the walls thereof is shown in Figs. 7 and 8. In this case, the diaphragm 4 is held at the edges by clamping rings 9 and 10, and, to the front ring 9, may be secured a small trumpet 11 for directing the sound waves. The clamping ring 10 is fixed to a suitable backing ring 12, having radial arms 13 by which the same is carried by a tube 14 which is capable of turning freely in the bearings 15—15, of the swinging arm 16, pivoted at 17 upon a rigid bracket 18, fixed to the cabinet 19. The cabinet 19 is provided with a suitable mechanism for rotating the turntable 20 upon which a record 21 is carried in the usual manner. The tube 14 is provided at one end with a mounting 22 freely rotatable upon said tube 14, but prevented in any suitable manner, from longitudinal movement upon the tube 14. This mounting 22 carries a stylus bar 23 which may be mounted thereon in any suitable manner, as by being pivoted on the knife edges 24, and retained on said knife edge bearings by a spring 25, in the usual manner. The upper end of the stylus bar 23 is connected by a rod 26 with the diaphragm 5, the rod 26 being connected or attached to the diaphragm by nuts 7 in the manner shown in Fig. 5. In this construction as shown in Figs. 7 and 8, the diaphragm is preferably made from a sheet of material such as is shown in Fig. 2 of the drawings so as to provide a suitable recess on each side of the diaphragm, in which the nuts 7 are seated. These nuts may be further cemented or otherwise secured to the diaphragm. In the said figures the diaphragm is also shown as being provided with a stiffening ring 8 at the center of the diaphragm and surrounding the stylus bar connection 26. Suitable nuts or collars 27 may be employed for holding the tube 14 from lengthwise movement in the bearings 15.

As the stylus 28 follows the record groove, the arm 16 will swing across the record on the pivot 17, and the mounting 22, carrying the stylus bar 23, will oscillate around the tube 14 with any unevenness in the rotation of the record. A suitable weight 29 may be attached to the mounting 22, to cause the stylus to engage the record with the requisite amount of pressure.

Figure 10:
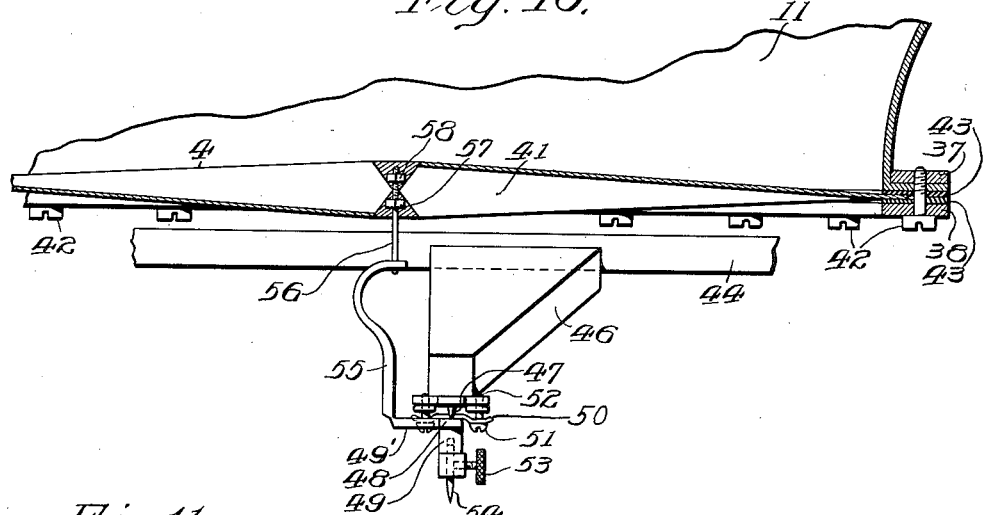

In Figs. 9, 10 and 11, I have illustrated a further modification of the way in which my diaphragm may be used in connection with a sound reproducing machine. In said figures, the record 21 is supported upon and rotated by a turn-table 20 driven by any suitable motor within the casing 19, and the cabinet is provided with a bracket 18 similar to the arrangement above described in connection with Figs. 7 and 8. An arm 30 is mounted upon a stem or pintle 31 to swing on said bracket in a plane substantially parallel with the plane of the record 21. The bracket 18 may be provided with a vertically adjustable stop 32 for the end of the stem 31, which, in the form illustrated in Fig. 9, consists of a screw threaded into the bracket 18, and against which the end of the stem or pintle 31 rests. By this means, the arm 30 may be raised or lowered to adjust the parts carried thereby with respect to the record 21 on the turn-table 20, to set the stylus at the proper angle to the record surface. The free end of the arm 30 carries a yoke 33 pivoted to the said arm by a bolt or pin 34, so as to be capable of swinging in a plane substantially perpendicular to the plane of the record. The said arm 30 is provided with a stop 35, which prevents the yoke from swinging downwardly beyond a predetermined point. The outer ends of the yoke 33 are secured to lugs 36 bolted to the rings 37, 38, by bolts 39, passing through said rings and said lug. Screws 40, passing through the ends of the yoke 33 and into the lugs 36, form the pivots to permit the rings and the parts carried thereby, to oscillate thereon. The diaphragm 41 is of the kind which I have described above; that is to say, the diaphragm is formed by reversely folding a sheet of material to form plaits, each plait forming an element of the diaphragm, and each of these plaits or elements is subjected to a torsional tension or strain by the bringing of the folded or plaited sheet of material into a substantially circular form. In these Figs. 9 to 11, the diaphragm is shown practically as being formed from a sheet of material such as is shown in Fig. 2; that is to say, a strip in which each plait is cut away at its inner corners so as to form a recess on each side of the center of the diaphragm to permit of a convenient attachment of the stylus bar to the diaphragm.

As is plainly shown in Fig. 10, the diaphragm 41 is clamped between the rings 37 and 38, and securely held in that position by means of the screws 42 passing through the said rings and drawing them together. I prefer, however, to interpose, between the rings 37 and 38, and the diaphragm, thin rings 43—43 of a suitable non-metallic and preferably slightly elastic material, one on each side of the diaphragm. These rings 43, may be of fabric, or rubber, or fiber, or any other suitable material to prevent an actual contact between the diaphragm and the metallic rings 37 and 38, and to securely hold the periphery of the diaphragm in a single plane. A suitable small trumpet 11, may be also secured between the rings for the purpose of directing the sound waves. I have shown it plainly in Figs. 9 and 10 as composed of a slightly flaring substantially conical member having a flange 11′ clamped between the rings 37 and 38, the screws 42 passing therethrough. The periphery of the diaphragm 41 is clamped between the intermediate rings 43, and held thereby in a single plane as plainly shown in Fig. 10.

The bottom of the reproducer is provided with a suitable support for the stylus bar, said support comprising a bar 44 secured to the ring 38 by screws 45, or in any other suitable manner. The said bar 44 may carry a block 46 rigidly secured thereto and upon the lower side of said block, I mount the stylus bar. Any suitable mounting for the stylus bar may be employed, but in the said modification illustrated in Figs. 9 to 11, I have shown the block 46 as provided with a pair of alined knife edges 47 engaging suitable recesses and lateral extensions 48 of the stylus bar 49. Each lateral extension is provided with a spring 50, one end of which is attached to said extension 48, and the other end of which extends outwardly and is provided with a hole through which a screw 51 passes, the head of the screw engaging the end of said spring 50 and the screw being threaded in a suitably tapped plate 52 carried by the said block 46. In this way the stylus bar is yieldingly held upon the knife edges 47, but is free to oscillate upon them as bearings.

The lower end of the stylus bar is provided with a suitable set screw 53 for securing the stylus 54 in the socket therein. The stylus bar 49 may have a portion 49′ extending at an angle to the stylus carrying portion and it may then extend upwardly as at 55 to the point of attachment to the center of the diaphragm. I have shown the said upwardly extending portion 55 as being curved in order to make it slightly yielding, and the point between the portions 49′ and 55 as being materially weakened to enable the stylus bar to readily bend or spring or give slightly at this point to transform the vibratory movement of the stylus into a reciprocatory movement of the portion 55 which is directly attached to and consequently communicates its motion to the center of the diaphragm.

In adjusting the reproducer to the recorded surface, the arm 30 should be set at such a height that the stylus will be given a slight rake to the recorded surface, as plainly shown in Fig. 9. This will permit the record to slide freely beneath the stylus without unduly scratching the same and cause the stylus to engage the record with a sufficient pressure to insure the tracking of the stylus in the record groove. The record may then slide freely beneath the stylus, and the whole reproducer may swing slightly on the bolts or pins 40 to allow for any irregularity or unevenness or warp in the recorded surface.

In order that the stylus may not bear too heavily upon the record, the trumpet 11 may be provided with a suitable counterbalance-weight 59.

From the preceding description it will be plain that the whole construction is such that the trumpet, diaphragm, rings and stylus attached thereto may be swung upwardly about the bolts or pin 34 as a pivot for the purpose of replacing the stylus or for throwing the whole device into an inoperative position, as indicated in dotted lines in Fig. 9.

In operation it will be apparent that when the record is given a rotary movement from the turn-table 20 and the stylus 54 engages the record 21, the whole reproducer will swing about the stem or pintle 31 as a pivot allowing the needle or stylus 54 to track across the record and the stylus will be caused to assume the correct angle to the recorded surface by the adjustment of the step 32 against which the stem or pintle 31 abuts, and further, that the stylus will be prevented from bearing too heavily upon the record by the counter-weight 59 attached to the upper end of the trumpet 11.

In all the forms which I have above described, it will be seen that the diaphragm is constructed upon the same principle, and that it is mounted in substantially the same way, and that any suitable manner of securing the stylus to the center of the diaphragm may be employed, and while I have shown a small trumpet 11 in connection with the constructions which I have illustrated, it is to be understood that the trumpet may be entirely dispensed with if desired, the function being to give direction to the sound waves rather than to increase the volume of the sound reproduced by the diaphragm.

Having thus described my invention, what I claim and desire to protect by Letters Patent of the United States, is:—

1. A phonic diaphragm having a plurality of reversely flexed sound-responsive elements, each of said elements being held distorted from a normal shape under a torsional stress and tending to return to said normal shape.

2. In a sound box, the combination of a diaphragm composed of a plurality of radial sound-responsive elements, tending to assume a position coincident with a plane surface, and means to hold said elements in a flexed position.

3. A phonic diaphragm having a plurality of radial flexed sound-responsive elements, each element held under a torsional stress due to its flexed condition and tending to return to an unflexed condition.

4. A phonic diaphragm, having its entire surface composed of adjacent like elements arranged to form both salient and reëntrant angles, said angles forming alternate radial ridges and grooves, each of said elements being held distorted from a normal condition by a torsional stress and tending to return to said normal condition.

5. In a sound box, the combination of a diaphragm, having a plurality of radial sound-responsive elements tending to assume a position coincident with a plane surface, and means to hold said elements in a flexed position, with the outer ends of said flexed elements in a single plane.

6. A phonic diaphragm, having a plurality of sound-responsive elements, the angle between adjacent pairs of which progressively varies.

7. A phonic diaphragm including a plurality of like elements, each element being arranged between and inclined with respect to adjacent elements, each element being held under a torsional stress, and said elements tending to assume positions coincident with a common plane.

8. A phonic diaphragm, comprising a plurality of helical sound-responsive elements, which tend to form a common plane surface.

9. A phonic diaphragm, having a plurality of torsioned elements radially disposed, said elements tending to assume positions coincident with a common plane.

10. A circular phonic diaphragm, having a plurality of elements, the slope of which transverse to the radius varies continuously from a maximum at the center of the diaphragm to a minimum at the periphery.

11. A phonic diaphragm, having a plurality of elements of transverse slope, varying progressively along a radius.

12. A phonic diaphragm having a plurality of like torsioned elements which tend to return to a normal configuration.

13. A phonic diaphragm, formed of a plurality of sound-responsive elements, each of which is distorted under tension intermediate of its peripheral portions by the relationship of adjacent elements, and positive means for restraining the peripheral portions, said elements tending to return to a normal configuration.

14. In a sound recording or reproducing machine, a diaphragm composed of a plurality of elements, each of which is normally subjected to torsional stress while in inoperative position, a stylus operatively connected to said diaphragm, and means to hold the edges of said diaphragm in substantially a single plane.

15. In a sound recorder or reproducer, a diaphragm composed of a plurality of elements, each of which is subjected to a torsional stress, the inner edge of each element being substantially parallel to the axis of the diaphragm.

16. In a sound recorder or reproducer, a diaphragm composed of a plurality of elements, each of which is subjected to a torsional stress, the inner edge of each element being substantially parallel to the axis of the diaphragm, and the corners of each element at the center of the diaphragm being beveled to form a recess at the center of the diaphragm.

17. In a sound recorder or reproducer, a diaphragm composed of a plurality of elements radially arranged, the inner edge of each element being substantially parallel to the axis of the diaphragm, and the outer edge of each element being substantially in a plane normal to the axis of said diaphragm.

18. In a sound recorder or reproducer, a diaphragm composed of a plurality of elements, the inner edge of each element being substantially parallel to the axis of the diaphragm, and means to hold the outer edge of each element in a single plane.

19. In a sound recorder or reproducer, a diaphragm composed of a plurality of helical elements radiating from the center of the diaphragm, and a stiffening ring secured to the outside edges of said elements.

20. In a sound recorder or reproducer, a diaphragm composed of a plurality of elements, each of which is distorted by a torsional stress and tends to return to a normal configuration, and clamping rings on each side of the peripheral edge of the diaphragm holding said edge in a single plane.

21. A phonic diaphragm comprising a body portion of substantially uniform thickness of material and arranged substantially in the form of a double cone.

22. A phonic diaphragm, comprising a body portion consisting of a single thickness of material and arranged substantially in the form of a double cone, having a substantially flat flexible rim and oppositely disposed radial plaits, tapering outwardly in depth from the center of said body portion.

23. A phonic diaphragm comprising a body portion consisting of a single thickness of material, having a substantially circular rim arranged in a single plane, said body portion being provided with radial plaits tapering outwardly in depth from the central portion of the diaphragm, said plaits having their alternate angles upon opposite sides of said plane and arranged in substantially balanced or symmetrical relationship thereto.

24. The combination with a phonic diaphragm of means normally holding said diaphragm, when in inoperative position, under a torsional stress.

25. A phonic diaphragm having a portion normally held, when in inoperative position, under a torsional stress and tending to return to its original state.

26. In a sound box, the combination with an annular support, of a diaphragm carried thereby, a bar secured to opposite portions of said support, a block rigidly secured to said bar, a stylus bar phonetically connected to said diaphragm and provided with oppositely disposed lateral extensions, alined knife edges between said extensions and said block and yielding means for holding said bar in position with respect to said block.

27. In a sound box, the combination with an annular support, of a diaphragm carried thereby, a bar secured to opposite portions of said support, a block rigidly secured to said bar, a stylus bar phonetically connected to said diaphragm and provided with oppositely disposed lateral extensions, alined knife edges between said extensions and said block, and yielding means for holding said bar in position with respect to said block, said yielding means comprising a spring between each of said extensions and said block.

28. In a sound box, the combination with a diaphragm, of a stylus bar comprising an inner portion phonetically connected to said diaphragm, and a comparatively rigid outer portion mounted to oscillate about a fixed axis and forming a continuation of, and extending substantially at a right angle with, said inner portion, said bar having a flexible reduced portion connecting and forming a hinge between said inner and outer portions at the vertex of said angle, and the oscillation of said outer portion producing a longitudinal reciprocation of said inner portion, said flexible portions being connected only to said inner and outer portions.

29. In a sound box, the combination with a diaphragm, of a stylus bar comprising an inner portion phonetically connected to said diaphragm, and a comparatively rigid outer portion mounted to oscillate about a fixed axis and forming a continuation of, and extending substantially at a right angle to, said inner portion, said bar having a flexible reduced portion connecting and forming a hinge between said inner and outer portions at the vertex of said angle, and the oscillation of said outer portion producing a longitudinal reciprocation of said inner portion, and said inner portion being partly in the form of a yielding loop to permit the effective length of said inner portion to be varied slightly by the oscillation of said outer portion, said flexible portions being connected only to said inner and outer portions.

30. In a sound box, the combination with a support, of a diaphragm carried thereby, and a stylus bar, said stylus bar including a comparatively rigid portion mounted to oscillate on said support, and a connecting portion between said first mentioned portion and said diaphragm, said portions being joined by a flexible reduced portion forming a hinge between and connected only to said first mentioned portions, and the oscillation of said first mentioned portion resulting in the longitudinal reciprocation of said connecting portion.

31. A phonic diaphragm having a portion normally distorted under a twisting stress while in an inoperative position, and tending to return to its original form.

In witness whereof I have hereunto set my hand this 11th day of March, A. D. 1910.

LOUIS LUMIERE.

Witnesses:
PAUL H. CRAM,
SEPTIMUS BRACHER.